US 8,850,797 B2

(12) United States Patent
Dougnier et al.

(10) Patent No.: US 8,850,797 B2
(45) Date of Patent: Oct. 7, 2014

(54) ENGINE EXHAUST GAS ADDITIVE STORAGE SYSTEM

(75) Inventors: Francois Dougnier, Boortmeerbeek (BE); Joel Op De Beeck, Duffel (BE)

(73) Assignee: Inergy Automotive Systems Research S.A., Brussels (BE)

( * ) Notice: Subject to any disclaimer, the term of this patent is extended or adjusted under 35 U.S.C. 154(b) by 672 days.

(21) Appl. No.: 12/300,838

(22) PCT Filed: Jun. 7, 2007

(86) PCT No.: PCT/EP2007/055613
§ 371 (c)(1),
(2), (4) Date: Nov. 14, 2008

(87) PCT Pub. No.: WO2007/141312
PCT Pub. Date: Dec. 13, 2007

(65) Prior Publication Data
US 2009/0230136 A1  Sep. 17, 2009

(30) Foreign Application Priority Data

Jun. 8, 2006  (FR) ..................................... 06 05082
Jan. 26, 2007  (FR) ..................................... 07 52912

(51) Int. Cl.
*F01N 3/00* (2006.01)
*F01N 3/20* (2006.01)

(52) U.S. Cl.
CPC ....... *F01N 3/2066* (2013.01); *F01N 2610/1433* (2013.01); *F01N 2610/14* (2013.01); *F01N 2610/10* (2013.01); *F01N 2510/0682* (2013.01); *F01N 2610/1406* (2013.01); *Y02T 10/24* (2013.01); *F01N 2610/02* (2013.01); *F01N 2610/1493* (2013.01)

USPC .............................................. 60/286; 60/295

(58) Field of Classification Search
USPC ............ 60/286, 295, 301, 303; 222/333, 385, 222/146.5
See application file for complete search history.

(56) References Cited

U.S. PATENT DOCUMENTS 5,219,422 A * 6/1993 Sato .............................. 222/282
5,628,186 A    5/1997 Schmelz
(Continued)

FOREIGN PATENT DOCUMENTS

DE      4432576 A1    3/1996
DE      195 31 424    2/1997
(Continued)

OTHER PUBLICATIONS

PCT Search Report dated Aug. 27, 2007 for International Application No. PCT/EP2007/055613 (3 p.).

(Continued)

*Primary Examiner* — Thomas Denion
*Assistant Examiner* — Matthew T Largi
(74) *Attorney, Agent, or Firm* — Oblon, Spivak, McClelland, Maier & Neustadt, L.L.P.

(57) ABSTRACT

System for storing an internal combustion engine exhaust gas liquid additive, the system comprising a tank for storing the additive and an "immersed" baseplate positioned through an opening made in the bottom wall of the tank, the baseplate comprising at least one orifice through which a system for injecting the additive into the exhaust gases can be fed, and also incorporating at least one other active component of the storage system and/or of the injection system.

15 Claims, 3 Drawing Sheets

(56) References Cited

U.S. PATENT DOCUMENTS

| | | | |
|---|---|---|---|
| 5,884,475 A | 3/1999 | Hofmann et al. | |
| 5,887,617 A * | 3/1999 | Frank | 137/574 |
| 5,988,213 A | 11/1999 | Yoshioka | |
| 6,063,350 A * | 5/2000 | Tarabulski et al. | 423/239.1 |
| 6,065,452 A * | 5/2000 | Yoshioka | 123/509 |
| 6,283,731 B1 * | 9/2001 | Yoshioka | 417/423.3 |
| 6,332,555 B1 | 12/2001 | Stangier | |
| 6,442,932 B1 * | 9/2002 | Hofmann et al. | 60/274 |
| 6,513,323 B1 * | 2/2003 | Weigl et al. | 60/286 |
| 7,849,674 B2 * | 12/2010 | Masuda et al. | 60/286 |
| 2002/0081239 A1 | 6/2002 | Palesch et al. | |
| 2003/0033799 A1 | 2/2003 | Scheying | |
| 2003/0101715 A1 | 6/2003 | Huthwohl | |
| 2004/0103652 A1 * | 6/2004 | Schaller et al. | 60/286 |
| 2005/0284871 A1 * | 12/2005 | Leonard et al. | 220/562 |
| 2006/0051276 A1 | 3/2006 | Schaller et al. | |

FOREIGN PATENT DOCUMENTS

| | | | |
|---|---|---|---|
| DE | 19935920 A1 * | 3/2001 | F01N 3/10 |
| DE | 100 64 801 | 6/2002 | |
| DE | 101 39 139 | 6/2003 | |
| DE | 103 37 572 | 3/2005 | |
| DE | 10 2004 044 825 | 3/2006 | |
| DE | 10 2004 048 076 | 4/2006 | |
| DE | 20 2006 001 760 | 5/2006 | |
| EP | 0 875 411 | 11/1998 | |
| EP | 0 959 241 | 11/1999 | |
| EP | 1 283 332 | 2/2003 | |
| EP | 1 561 626 | 8/2005 | |
| EP | 1602805 A1 | 12/2005 | |
| EP | 1 767 417 | 3/2007 | |
| EP | 1 925 354 | 5/2008 | |
| FR | 2 830 283 | 4/2003 | |
| GB | 903472 | 8/1962 | |
| JP | Hei6-50050 | 6/1994 | |
| JP | 2002-511807 | 4/2002 | |
| JP | 2002-527660 | 8/2002 | |
| JP | 2005282413 A * | 10/2005 | F01N 3/08 |
| JP | 2006-83718 | 3/2006 | |
| KR | 2005-068740 | 7/2005 | |
| WO | WO9843732 A1 | 10/1998 | |
| WO | WO2004042208 A1 | 5/2004 | |
| WO | 2004/085189 | 10/2004 | |
| WO | 2005/045226 | 5/2005 | |
| WO | 2005/054638 | 6/2005 | |
| WO | 2006/064028 | 6/2006 | |

OTHER PUBLICATIONS

Search Report from the Institut National De La Propriete Industrielle dated Feb. 8, 2007 for French Application No. 06.05082 (2 p.).

U.S. Appl. No. 61/097,581 by Joel Op De Beeck, filed Sep. 17, 2008—not published in US.

Office Action issued Aug. 19, 2011, in Chinese Patent Application No. 200780020619.7, filed Jun. 7, 2007 (with English-language translation).

Partial English translation of Proprietor's Observations in Opposition Proceedings in EP 2029865 dated Feb. 13, 2012.

Japanese Office Action with English translation mailed on Aug. 21, 2012 in corresponding Japanese application No. 2009-513698.

Korean Office Action issued on Jul. 2, 2014 in corresponding Korean Patent Application No. 2014-7012545 with English translation.

* cited by examiner

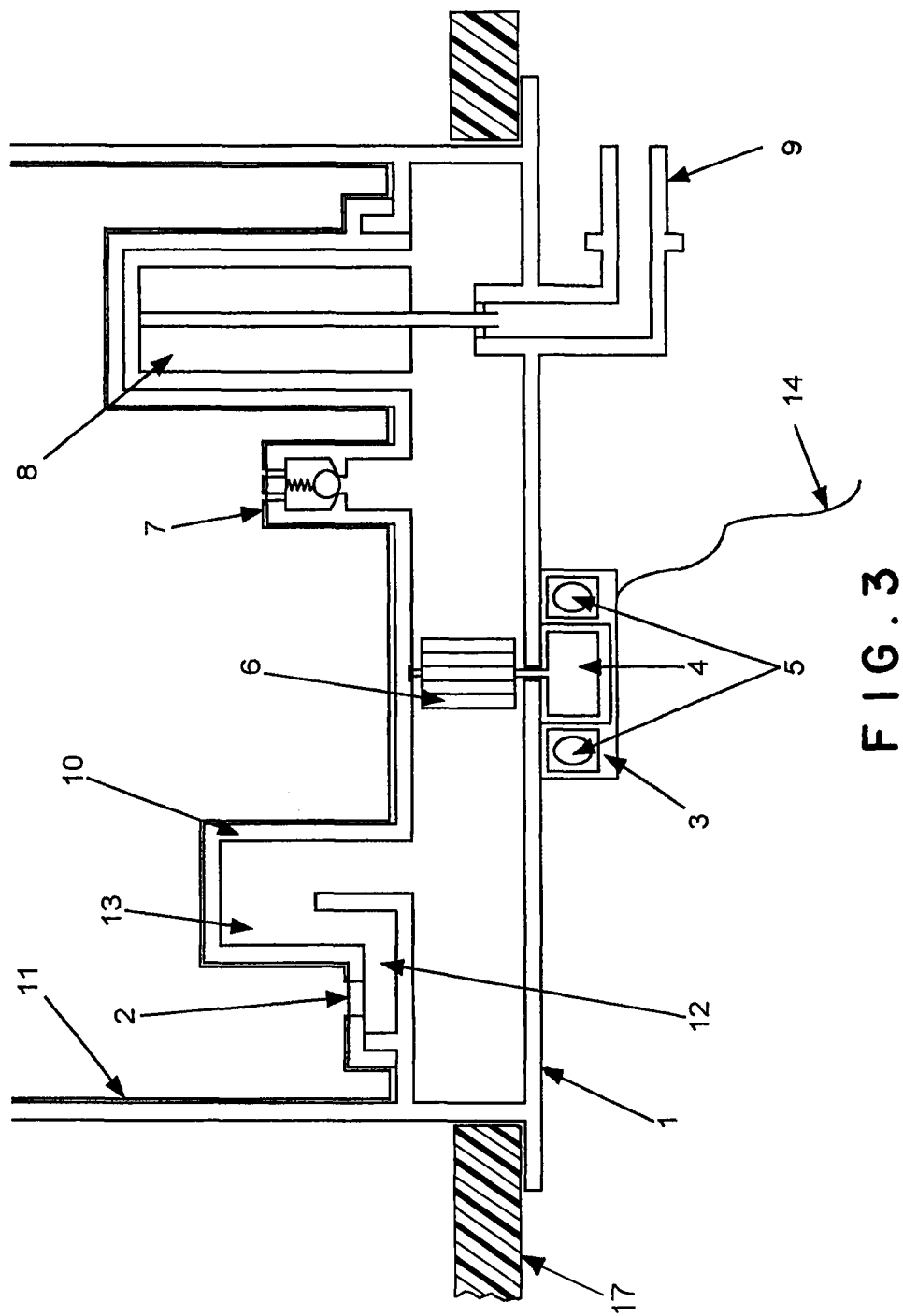
F I G. 3

ENGINE EXHAUST GAS ADDITIVE STORAGE SYSTEM

CROSS-REFERENCE TO RELATED APPLICATIONS

This application is a U.S. national stage application under 35 U.S.C. §371 of International Application No. PCT/EP2007/055613, filed Jun. 7, 2007, which claims priority to French Application No. 06.05082, filed Jun. 8, 2006 and to French Application No. 07.52912, filed Jan. 26, 2007, each of these applications being incorporated herein by reference for all purposes.

BACKGROUND OF THE INVENTION

I. Field of the Invention

The present application relates to an engine exhaust gas additive storage system.

II. Description of Related Art

Legislation concerning emissions from vehicles and heavy goods vehicles stipulate, among other things, a reduction in the amount of oxides of nitrogen $NO_x$ discharged into the atmosphere. One known way to achieve this requirement is to use SCR (selective catalytic reduction) which allows for reduction of the oxides of nitrogen by injecting a reducing agent, generally ammonia, into the exhaust system. This ammonia may originate from the thermolytic decomposition of a solution of an ammonia precursor, the concentration of which may be the eutectic concentration. An ammonia precursor such as this is generally a solution of urea.

Using the SCR method, the high levels of $NO_x$ produced in the engine during combustion at optimized efficiency are treated in a catalytic converter as they leave the engine. This treatment requires the use of the reducing agent at a precise concentration and extreme quality. The solution is thus metered accurately and injected into the exhaust gas stream where it is hydrolysed before converting the oxide of nitrogen ($NO_x$) into nitrogen ($N_2$) and water ($H_2O$).

To do this, it is necessary for the vehicles to be equipped with a tank containing a solution of additive (generally urea) and with a device for metering and injecting the desired amount of additive into the exhaust system.

Various systems for storing and feeding reducing additives have been provided in the prior art, and these can be split roughly into two categories: those which withdraw the required amount of additive directly (and which therefore do not recirculate the additive solution) and those which do recirculate the additive solution.

In the $1^{st}$ case, the metering device (which may be a pump or a metering valve) can be fed with additive simply under gravity, via a line starting in the bottom of the storage tank. U.S. Pat. No. 5,628,186 describes a system such as this.

In the $2^{nd}$ case, where the outward and return flows are generally controlled using a pressure regulator, the additive is metered under pressure and recourse is generally had to a pump for generating this pressure. U.S. Pat. No. 6,063,350 describes a system such as this.

In order to be able to meter the solution of additive correctly into the exhaust gases, it is known practice to incorporate into the additive tank elements such as a level gauge, a temperature sensor, a quality sensor, a resistive heating element, etc. The aforementioned U.S. Pat. No. 6,063,350 proposes to group these various components together in the baseplate of the pump, positioned on the top wall of the tank. This approach makes it easier to incorporate the system into the vehicle (as all the connections are grouped together in the same place) and makes it possible to reduce the number of openings made in the wall of the tank. However, the fact that the baseplate is situated on the top wall of the tank has numerous disadvantages:

- there are high points in the feed and return lines, where there is a risk that the gases resulting from a possible decomposition of the additive may accumulate;
- it becomes necessary to provide a trap to prevent the pump from running dry and losing its prime;
- gauging becomes somewhat inaccurate as a result of deformation of the end wall of the tank over the course of its life;
- the components suffer prolonged exposure to additive vapours, even though these vapours are often corrosive (ammonia is present in the case of urea);
- some components may become damaged in the event of freezing, because lumps of solid additive floating at the surface may, as they move around, strike the said components.

SUMMARY OF THE INVENTION

The present application is aimed at providing an engine exhaust gas additive storage system that makes it possible to reduce or even completely avoid the aforementioned disadvantages.

To this end, the present invention relates to a system for storing an internal combustion engine exhaust gas liquid additive, the said system comprising a tank for storing the additive and an "immersed" baseplate positioned through an opening made in the bottom wall of the tank, the said baseplate comprising at least one orifice through which a system for injecting the said additive into the exhaust gases can be fed, and also incorporating at least one other active component of the storage system and/or of the injection system.

The term "bottom wall" is in fact, in the context of the invention, intended to denote the bottom half of the tank (whether or not it is moulded in one piece or from two sheets or parison halves). As a preference, the baseplate is located in the bottom third of the tank, and as an especial preference, in the bottom quarter, or even actually in the bottom of the tank. It may be partially situated on the bottom side wall, in which case it is at a slight angle once it is mounted in the vehicle. The location and/or direction of the baseplate depends in particular on the location of the tank within the vehicle, and on the space around it (given the components that need to be incorporated into it).

The additive to which the invention relates is an additive that is liquid under normal conditions of use. It is preferably a reducing agent capable of reducing the $NO_x$ present in the exhaust gases of internal combustion engines. It is advantageously a solution of a precursor which generates ammonia (the actual reducing agent) in situ, within the exhaust gases. The invention yields good results with urea as a precursor and, in particular, with aqueous solutions of urea. Eutectic solutions (containing 32.5 wt % of urea) are highly suitable. It must, however, be noted that these freeze at around −11° C. and that it is therefore advantageous to equip the system with a heater to guard against freezing, this heater advantageously being incorporated into the baseplate according to the invention (see later).

The present invention may be applied to any internal combustion engine likely to generate $NO_x$ in its exhaust gases. This may be an engine with or without a fuel return line (that is to say a line returning any surplus fuel not used by the engine to the fuel tank). It is advantageously applied to diesel engines and, in particular, to diesel engines of vehicles and, as an especial preference, to the diesel engines of heavy goods vehicles.

The system according to the invention comprises at least one tank intended to store the additive. This tank may be made of any material, preferably one which has chemical resistance to the additive concerned. This will generally be a metal or a plastic. In the case of urea, polyolefin resins, particularly polyethylene (and more particularly, HDPE or high density polyethylene) are preferred materials.

According to the invention, the tank is equipped with a baseplate or mounting plate which is a flattened component (that is to say a component the thickness of which is smaller than its length or diameter) intended to blank off an opening in its bottom wall. It should be noted that this part may be hollow and define a space which communicates with the tank via an orifice through which the additive can flow.

The baseplate is, in particular, highly suited to supporting accessories which pass through the wall of the hollow body and/or are positioned inside the latter. It has a perimeter that is closed up on itself, of any shape. Usually, its perimeter is of circular shape.

According to the invention, this baseplate comprises at least one orifice through which a system for injecting the said additive into the exhaust gases can be fed. This feed may be achieved simply under gravity via an injection line passing through the baseplate via the said orifice. Alternatively and as a preference, the system is fed by a pump.

The baseplate also incorporates at least one component that is active in storage and/or injection. What that means is that the component is fixed onto or formed as one with the baseplate. This component may be incorporated inside the tank, or on the outside with, if necessary, a connection passing through it.

As a preference, the baseplate according to the invention incorporates several components that are active in storage and/or metering and as an especial preference, it incorporates all the active components which need to be in contact with the liquid additive in, leaving or entering the additive tank.

As a preference, the component is chosen from the following group: a pump; a filter; a level gauge; a heater; a temperature sensor; a quality sensor; a pressure sensor; a pressure regulator; a venturi tube. These elements all have an active part to play in the system for storing and/or injecting the additive, and the fact of incorporating them onto an "immersed" mounting plate (that is to say a mounting plate that is always in the additive, provided that the tank is not empty) exhibits specific advantages:

for the pump: the solution of ammonia precursor can be used to cool the pump; in the event of freezing, the heat dissipated by the pump contributes to the return to the liquid state;

for the level gauge: the lowermost point is better defined and therefore the measurement is less subject to the influence of deformations of the tank;

for the heater: in the event of freezing, the forming of a compartment through the design of the mounting plate associated with the heating system allows the volume of additive solution needed to operate the pollution-reducing system to be delivered within the time frame required by motor manufacturers (for example: 100 ml in three minutes);

for the temperature sensors, quality sensors or sensors that sense other characteristic(s) of the additive: these can easily be situated in the critical region in terms of feeding the injection system;

for the venturi tube: it becomes heated while the precursor is being defrosted in the event of low temperatures, ensuring that this component retains its functionality.

The level gauge, which may be incorporated into the baseplate according to the invention, may be of any type. Preferably, it is a gauge with no moving parts, for example of the capacitive type.

As for the heating, it may comprise a heat exchanger of given capacity, or a heating element, preferably surrounded by or surrounding a space (to create the aforementioned compartment). As a preference, this space is of one piece (moulded as one, as appropriate) with the baseplate. Also as a preference, the heater comprises a flexible component exhibiting a multilayer structure consisting of a resistive element insulated between two layers of elastomer (silicone for instance). The use of a flexible heater allows it to be adapted to suit a great many baseplates. In particular, in the event that the baseplate comprises nipples, the heater is equipped with tabs which can be inserted inside the nipples of the baseplate thus avoiding plugs from forming at low temperatures if the solution of precursor freezes.

The temperature and quality sensors may also be of any known type. Any other sensor used to measure a characteristic of the additive (purity, concentration, etc.) is suitable for use with the invention.

The present invention also relates to a feed system for feeding a liquid additive into the exhaust gases of an internal combustion engine, the said system comprising a storage system as described hereinabove and an injection system for injecting the said additive into the engine exhaust gases. This injection system comprises at least one injection line and one injector (that is to say a device for dispersing/nebulizing the liquid additive in the exhaust gases). This injector may be an active injector, controlled for in-situ metering of the additive, or a passive injector the role of which is confined to nebulizing the quantity of additive metered by a suitable device located upstream (generally a metering pump or valve).

The feed system according to the invention may or may not comprise a pump for conveying the additive from the additive tank to the injector. As a preference, it comprises a pump (in order to be able to generate a stable injection pressure) and in a preferred variant, this pump is fixed to the baseplate. This pump may be situated inside the additive tank (with the advantage that they together constitute a compact integrated module) or, given the corrosive environment, may be situated outside the additive tank. The materials of which it is made will preferably be chosen from metals that are able to resist corrosion (certain grades of stainless steel and of aluminium in particular). Recourse to copper, even for connectors, is not desirable. The pump draws liquid additive from a point known as the tapping-off point in the additive tank. This point is connected to the pump by a line known as the pumping line. This point is preferably situated near or even on the baseplate.

The amount of additive delivered by the pump and not consumed by the injector (depending on the control from the control unit), if any, is advantageously returned to the additive tank by a line known as the additive return line. This line is generally equipped with a pressure regulator and/or with a pressure sensor. It connects either the injector or some other point on the injection line downstream of the pump to the additive tank. In this variant, advantageously, the pressure regulator and/or sensor is/are preferably also incorporated into the baseplate, that is to say fixed onto the latter, preferably inside the tank.

The feed system according to the invention preferably also comprises a filter, which is, as an especial preference, also incorporated into/fixed onto the baseplate. This filter may be situated upstream or downstream of the pump. When situated upstream of the pump, the filter protects the pump. As a preference, it is situated downstream of the pump so as to avoid pressure drops and cavitation phenomena.

The baseplate may also comprise at least one nipple for conveying the solution of urea precursor to the injector. In the event that a return-to-tank line is provided, a second nipple may be provided.

Depending on the purge system adopted for the lines and on the components connected thereto, provision may be made for the baseplate to be equipped with bowls/siphons which prevent the liquid from returning from the tank to the pipework, or with any other device performing the same function. Indeed, although in general the pump places the pipework under a certain pressure, which generally prevents such return, the head of liquid in the tank may, in some cases, be enough to overcome this pressure and in spite of everything cause a small stream of liquid to flow towards the pipework. Equipping the orifice of orifices that provide the communication between the tank and the pipework with appropriately sized bowls/siphons makes it possible to avoid this phenomenon.

In response to the geometric constraints on the tank which are imposed, in particular, by the vehicle environment, the baseplate may be equipped with a trap which creates a reserve of liquid that can be tapped off depending on the orientation of the vehicle. If need be, the baseplate may incorporate a device (for example of the venturi type which may be connected after the nipple in the return line) allowing the trap to be fed from a tapping-off point situated in the tank.

Usually, the feed system according to the invention comprises a control unit either connected directly to the injector (in the case of an active injector) or connected to a separate metering device (in the case of a passive injector) and allowing the required amount of additive to be injected into the exhaust gases (the amount being dependent in particular on the following parameters: level of emission and conversion of $NO_x$; temperature and pressure; engine speed and load; etc.). According to the invention, advantageously, the baseplate and/or the component incorporated into the latter comprises a connection to this control unit.

The control unit involved in this variant may be the engine control unit (ECU) or some other control unit incorporated into the vehicle (for example the fuel system control unit (FSCU)). It may equally be a special-purpose control unit receiving instructions/information from the ECU, from the FSCU or from some other control unit incorporated into the vehicle.

The present invention also relates to a method for manufacturing a system as described hereinabove. In particular, it relates to a method for manufacturing the storage tank of this system.

This tank may be produced by any processing method known for hollow bodies. One preferred procedure, particularly when the tank is made of plastic, and in particular when it is made of HDPE, is the extrusion/blow-moulding method. In this method, a parison (in one or more parts) is obtained by extrusion, and is then shaped in a mould by blow-moulding. Moulding the tank as one piece from a single parison yields good results.

The immersed baseplate of this tank may also be obtained by any known means, but as a preference it is obtained by injection moulding, this method making it possible to obtain good dimensional accuracy.

As a preference, the baseplate is based on a material able to resist aqueous solutions of ammonia precursor, such as polyacetal and, in particular, POM (polyoxymethylene); polyphtalamides (AMODEL® resins for instance); or polyamides (for example nylon-6,6) and, in particular, reinforced grades (for example glass-fibre-reinforced plastics).

As a preference, the baseplate is provided with attachment systems for the active components that it is to incorporate. These systems may be moulded as one with the baseplate or inserts needed for this purpose may be added during the moulding process (using overmoulding for example) or after the moulding process (using welding). When the heater comprises a flexible film, this is attached using clips (injected for example in nylon-6,6,) which are inserted in the holes in the mounting plate and in those in the heater which correspond to the former holes.

The opening in the bottom wall of the tank may be produced by any appropriate means, for example by machining the moulded tank. As a preference, its periphery has a relief (a protrusion with a screw thread for example) to make it easier to attach the baseplate, and which is moulded at the same time as the tank.

The baseplate may also be assembled with the opening in the tank by any known means, particularly using a ring-nut system screwed onto a thread on the tank side, this thread preferably being produced during the blow-moulding of the tank (through a suitable shape of mould) or using a closure system of the bayonet type. A gasket (preferably made of elastomer, NBR or EPDM, for example) preferably provides a seal between the edge of the opening in the tank and the baseplate. As a preference, this gasket rests on a channel formed around the periphery of the baseplate and is preferably compressed between the periphery of the opening in the tank and the baseplate.

BRIEF DESCRIPTION OF THE DRAWINGS

The present invention is illustrated nonlimitingly by FIGS. 1 to 3 which illustrate a number of preferred variants thereof.

FIG. 3 illustrates a sectional view of a third exemplary embodiment of a system for storing an additive.

DETAILED DESCRIPTION OF THE INVENTION

Figure 1:
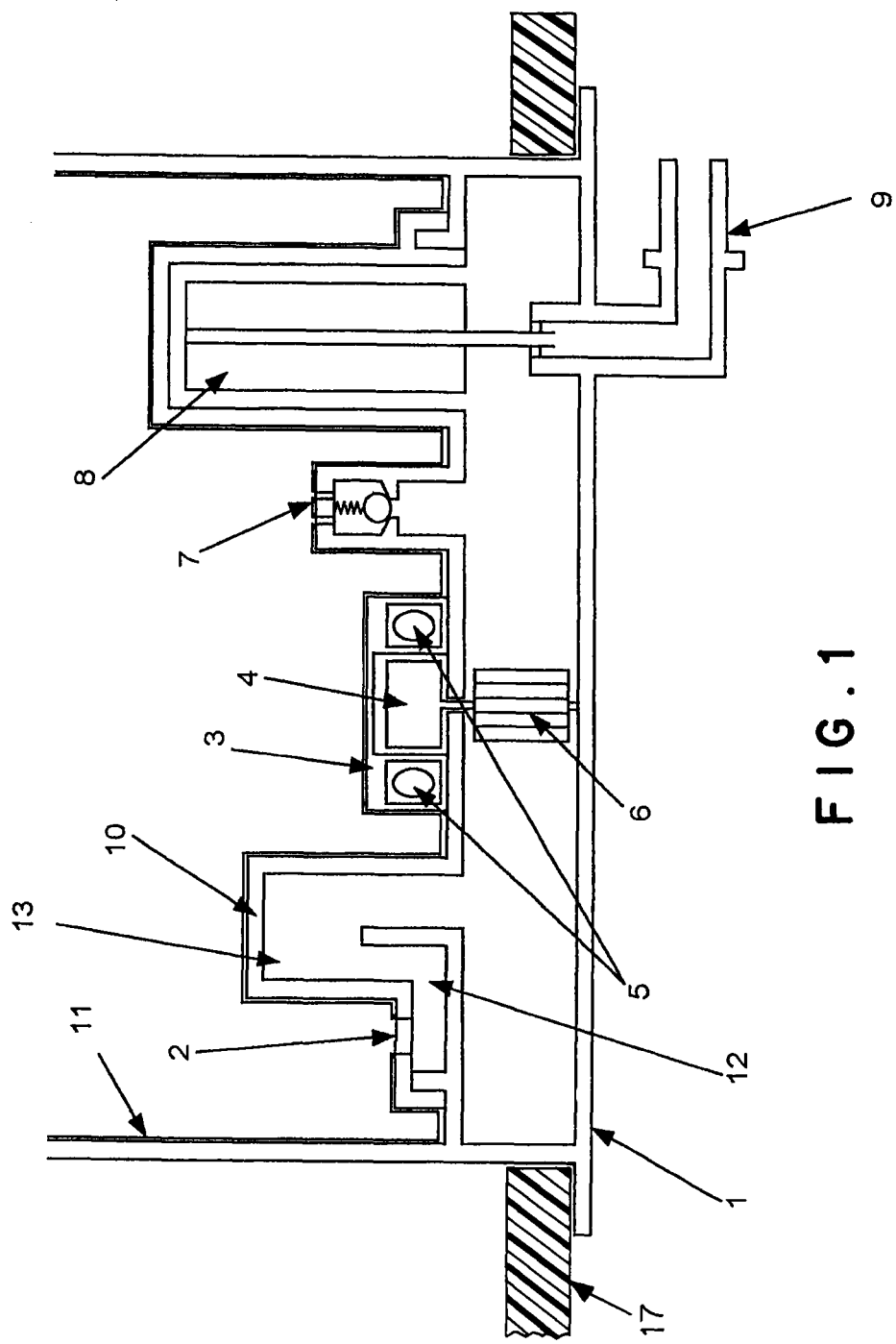
FIG. 1 illustrates a sectional view of an exemplary embodiment of a system for storing an additive.

FIG. 1 shows a baseplate [1] fixed to the bottom face of an additive tank [17] and comprising a support [10] allowing the assembly of a pump [3], a preloaded valve [7] and a filter [8]. In this example, the pump is a gear pump [6] and is turned by an electric motor comprising a magnet [4] and a coil [5]. The baseplate [1] also comprises a nipple [9] connected to a pipe connected to an injector or nozzle (not depicted) for spraying the additive (solution of ammonia precursor such as urea for example) into the exhaust system (not depicted). The assembly is surmounted by a heating element [11] allowing the system to operate at low temperatures (to thaw the ammonia precursor).

This assembly has at least two operating modes: an injection mode and a purge mode.

In the injection mode, the task is to spray the solution of ammonia precursor into the exhaust system of the vehicle. To do that, the pump [3] is activated so as to allow it to draw the solution contained in the tank up through the orifice [2]. The fluid than passes through the filter [8] and is conveyed by the nipple [9] to the pipe that is connected to an injector or to a nozzle. The raised pressure needed for a good quality spray is controlled by the preloaded valve [7].

In purge mode, the task is to drain the injector, the pipework, the filter and the volume in which the gear system of the pump is located.

The injector or a purge valve situated on the pipe connected to the nipple [9] is opened. The pump [3] is then activated in such a way as to draw liquid from the injector or the nozzle and deliver it back to the tank via the orifice [2]. A device of the bowl [13] and siphon [12] type prevents liquid from returning to the purged volume when the pump is stopped.

Figure 2:
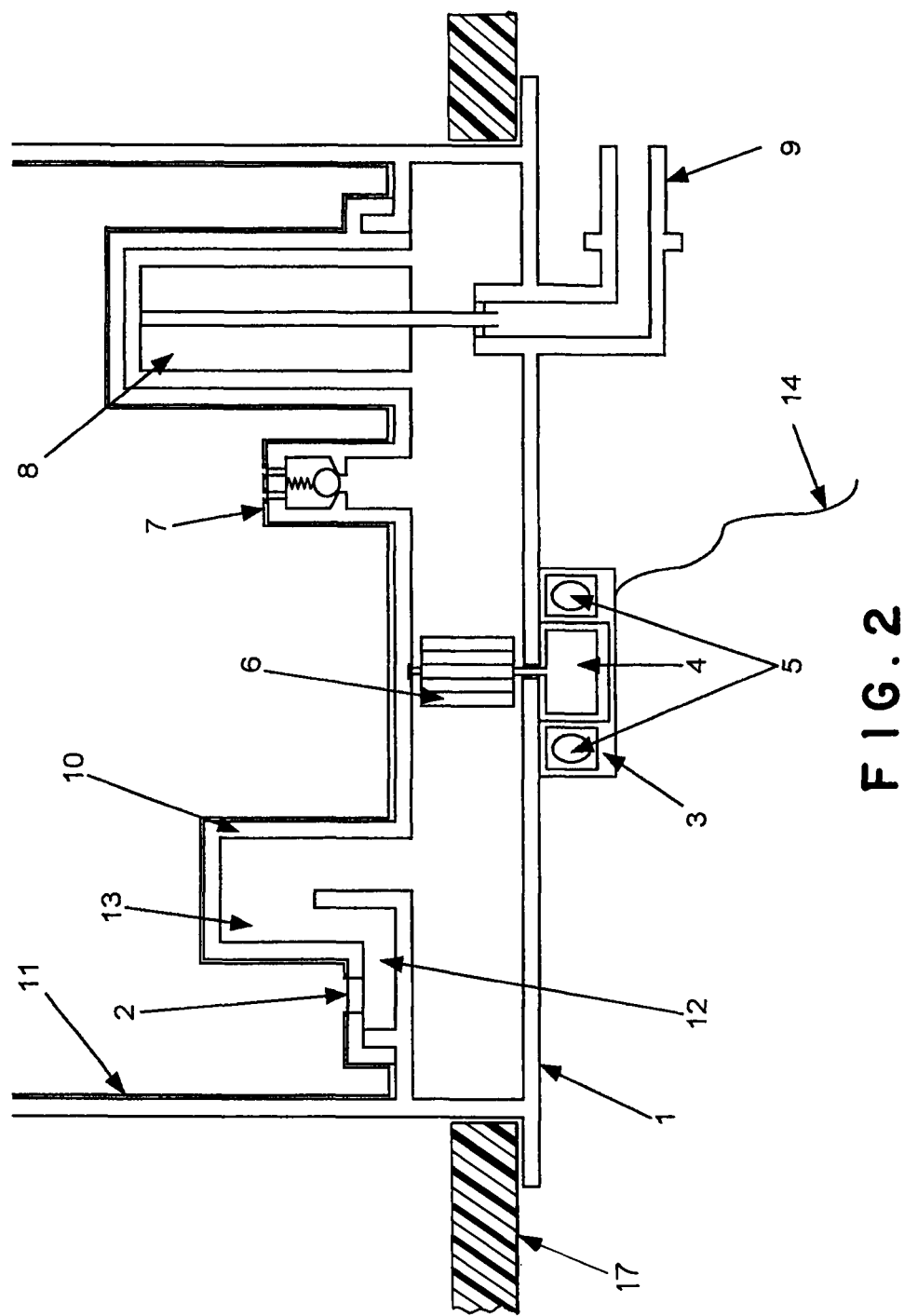
FIG. 2 illustrates a sectional view of a second exemplary embodiment of a system for storing an additive.

In the variant illustrated in FIG. 2, the electric motor [4, 5] is incorporated under the baseplate [1], outside the tank. By comparison with the preceding example, electrical connection (supply cord [14]) may be easier.

In the variant illustrated in FIG. 3, in addition to the components and functionalities illustrated in FIGS. 1 and 2, the baseplate [1] incorporates a level sensor [15] and a temperature probe [16].

Another exemplary embodiment comprises a baseplate mounting plate on which a filter, a gear pump actuated by a brushless motor and a pressure regulator are assembled. The mounting plate has a feed nipple and a nipple connected to the injector return line, able to take a purge valve. The mounting plate is equipped with a heating element consisting of a flexible sheet of multilayer structure and fixed to the mounting plate by a series of clips. The heating element has extensions which rest on the bottom of the tank, allowing an additional volume of ammonia precursor to be thawed. The liquid returns from the tank to the baseplate through openings made in the mounting plate. The flexible heater is designed with heating tabs inserted into the nipples and to prevent a solid plug from forming if the solution of precursor freezes inside the nipples.

The invention claimed is:

1. A system for storing an internal combustion engine exhaust gas liquid additive, the system comprising:
   a plastic tank configured to store the additive, the additive being an aqueous urea solution, and
   an immersed plastic baseplate positioned through an opening made in the bottom wall of the tank, said baseplate comprising at least one orifice through which a system that injects said additive into the exhaust gases is fed, and also incorporating at least one other active component of at least one of the storage system and the injection system, wherein the baseplate includes a vertical wall that abuts a periphery of the opening made in the bottom wall of the tank.

2. The storage system according to claim 1, wherein the baseplate incorporates an additive heater.

3. The storage system according to claim 2, wherein the baseplate incorporates a level gauge.

4. The storage system according to claim 2, wherein the baseplate incorporates a sensor used to measure a characteristic of the additive.

5. A feed system for feeding a liquid additive into the exhaust gases of an internal combustion engine, said system comprising a storage system according to claim 2 and an injection system comprising at least one injection line and one injector.

6. The feed system according to claim 5, comprising a pump which is fixed to the baseplate.

7. The feed system according to claim 6, wherein an amount of additive delivered by the pump and not consumed by the injector is returned to the additive tank by a line known as the return line which is equipped with at least one of a pressure regulator and a pressure sensor which is/are incorporated into the baseplate.

8. The feed system according to claim 5, comprising a filter incorporated into or fixed onto the baseplate.

9. The feed system according to claim 5, wherein the baseplate incorporates a nipple that conveys the liquid additive to at least one of the injector and a nipple that returns unused liquid additive to the tank.

10. The feed system according to claim 5, wherein said system comprises a device that purges the injection line, and wherein the baseplate comprises a device that prevents liquid from the tank from returning to the injection line when the injection line has been purged.

11. The feed system according to claim 5, wherein the baseplate comprises a trap and a device of the venturi type allowing the trap to be fed from a tapping-off point in the tank.

12. The feed system according to claim 5, comprising a control unit and wherein at least one of the baseplate and the component incorporated into the latter comprises a connection to this control unit.

13. A method for manufacturing a storage system according to claim 2, wherein the storage tank is obtained by extrusion/blow-moulding plastic and wherein the baseplate is produced by injecting moulding plastic.

14. A system for storing an aqueous solution of urea, said system comprising:
   a tank to store the aqueous solution of urea; and
   an immersed baseplate positioned through an opening made in the bottom wall of the tank, said baseplate comprising at least one orifice through which a system that injects said aqueous solution of urea into exhaust gases is fed, and also incorporating at least one other active component of at least one of the storage system and the injection system, wherein
   a filter is incorporated into or fixed onto the baseplate, said filter being arranged to convey filtered aqueous urea solution to said opening, wherein
   the baseplate incorporates a heater,
   said tank is made of a plastic having a chemical resistance to the aqueous solution of urea, and the baseplate includes a vertical wall that abuts a periphery of the opening made in the bottom wall of the tank.

15. A system for storing an aqueous solution of urea, said system comprising:
   a tank to store the aqueous solution of urea; and
   an immersed baseplate positioned through an opening made in the bottom wall of the tank, said baseplate comprising at least one orifice through which a system that injects said aqueous solution of urea into exhaust gases is fed, and also incorporating at least one other active component of at least one of the storage system and the injection system, wherein
   said baseplate incorporates a heater,
   said baseplate is designed to form a compartment associated with the heater, and the baseplate includes a vertical wall that abuts a periphery of the opening made in the bottom wall of the tank.

* * * * *